United States Patent [19]

Krude

[11] 4,090,751
[45] May 23, 1978

[54] WHEEL BEARING ASSEMBLY FOR A WHEEL HUB OF A MOTOR VEHICLE

[75] Inventor: Werner Krude, Neunkirchen, Germany

[73] Assignee: Uni-Cardan AG, Lohmar, Germany

[21] Appl. No.: 750,169

[22] Filed: Dec. 13, 1976

[30] Foreign Application Priority Data

Dec. 13, 1975 Germany .............................. 2556177

[51] Int. Cl.² .......................................... F16C 13/02
[52] U.S. Cl. ........................................ 308/191; 64/21;
180/43 R; 301/6 D; 301/109
[58] Field of Search ...................... 308/16, 189 R, 190,
308/191; 301/6 D, 105 R, 109, 110, 126; 180/43
R, 70 R; 64/21

[56] References Cited

U.S. PATENT DOCUMENTS

| 567,309 | 9/1896 | Farnsworth | 308/191 |
| 3,583,511 | 6/1971 | Asberg | 308/191 |

FOREIGN PATENT DOCUMENTS

| 2,329,554 | 2/1975 | Germany | 301/109 |
| 2,460,448 | 6/1976 | Germany | 308/190 |
| 1,298,552 | 12/1972 | United Kingdom | 308/191 |

Primary Examiner—Trygve M. Blix
Assistant Examiner—Charles E. Frankfort
Attorney, Agent, or Firm—Edmund M. Jaskiewicz

[57] ABSTRACT

A wheel bearing assembly has an outer bearing ring for mounting on a wheel support and an inner bearing ring having a bore and connected to a wheel hub. A constant velocity torque transmitting joint has an outer joint member disposed within the inner bearing ring bore and nonrotatably connected to the wheel hub. The inner joint member is centered with respect to the wheel hub. The outer joint member is rotatable within the inner bearing ring but is secured therein against axial movement.

13 Claims, 14 Drawing Figures

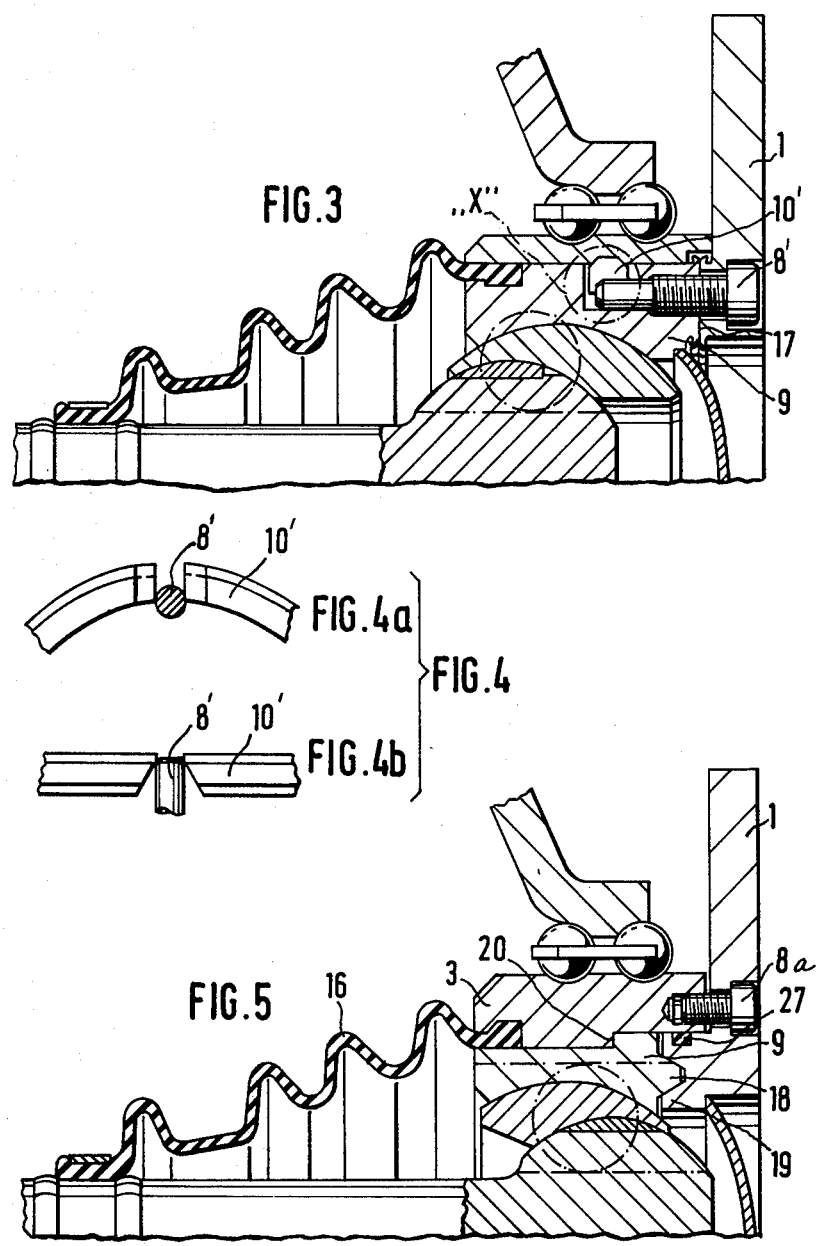

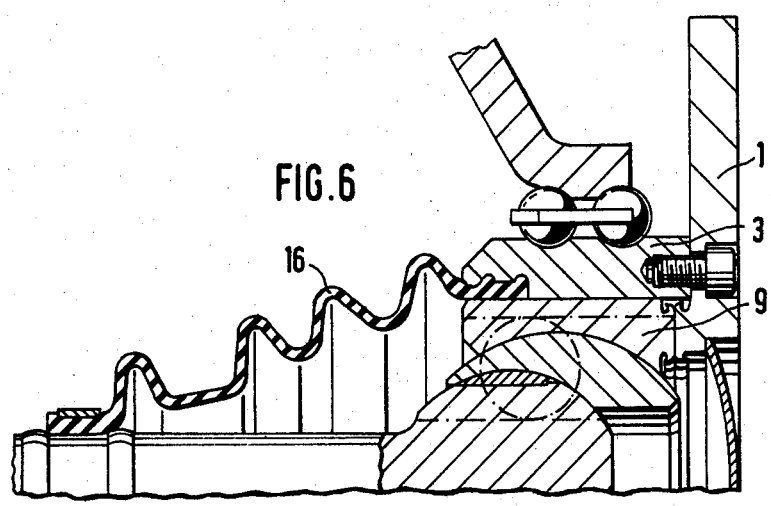
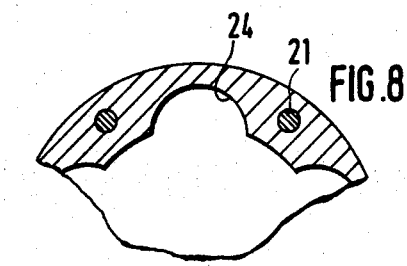
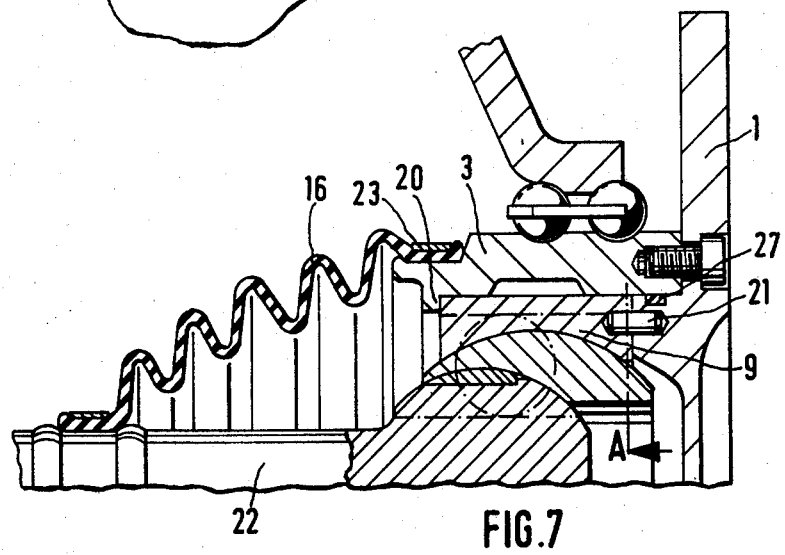

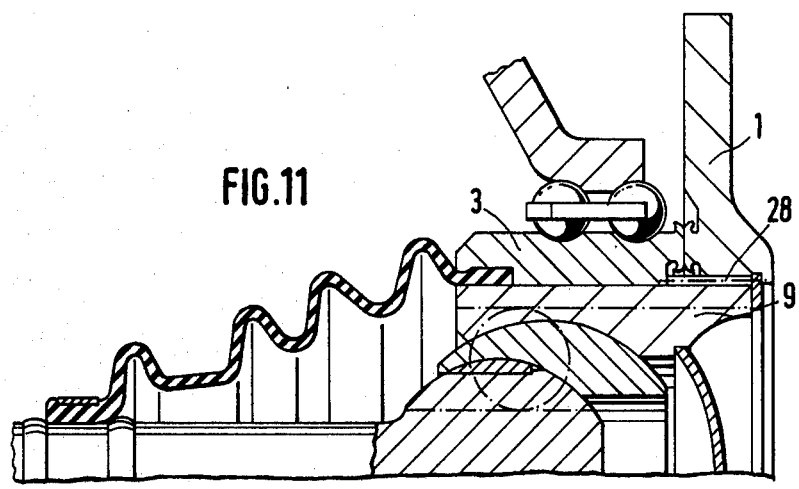
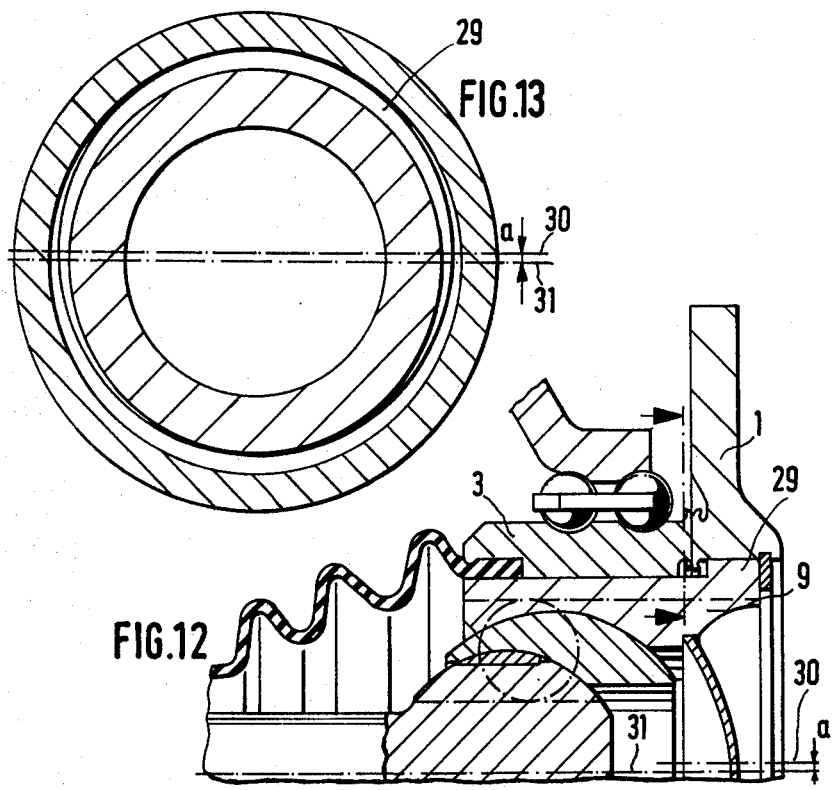

WHEEL BEARING ASSEMBLY FOR A WHEEL HUB OF A MOTOR VEHICLE

The present invention relates to a bearing assembly for a wheel hub of a motor vehicle wherein the hub is driven through a constant velocity torque transmitting joint, more particularly, to the mounting of the bearing rings and joint members with respect to the wheel hub.

Various forms of bearing assemblies have been proposed for a wheel hub on the wheel support of a motor vehicle wherein the hub is driven through a constant velocity torque transmitting joint. The outer bearing ring is generally secured to the wheel support and the inner bearing ring is connected with the wheel hub and the constant velocity joint. The inner bearing ring has an opening therethrough within which is positioned the outer joint member of the constant velocity joint.

Certain ones of such known wheel bearing assemblies have incorporated a one-piece construction of the inner bearing ring and the outer joint member of the universal joint, and, in one form, also with the wheel flange. This construction has the disadvantage that these several components present certain difficulties in manufacture and thus are relatively expensive. Further, the grooves in the members of the universal joint in which are received the torque transmitting balls, the surfaces for mounting of the bearings and the wheel flange must be constructed to different standards in order to satisfy the different operating demands on these components. It is thus necessary that these components be constructed of materials of different quality and characteristics.

A further disadvantage of such wheel bearing assemblies is that it is extremely difficult to replace any of the components because in order to disassemble the power transmission shaft the entire bearing assembly must be removed from the ball heads of the suspension or the wheel bearing must be disassembled.

It is therefore the principal object of the present invention to provide a novel and improved wheel bearing assembly of the type described herein which facilitates and simplifies the assembly or removal of the drive shaft with respect to the wheel hub.

It is another object of the present invention to provide such a wheel bearing assembly wherein the distance between the center of the universal joint and the steering axis of the wheel hub is maintained at a desired minimum.

It is a further object of the present invention to provide such a wheel bearing assembly which reduces the required bending angles of the universal joint.

According to one aspect of the present invention a wheel bearing assembly for a wheel hub of a motor vehicle may comprise an outer bearing ring which is adapted to be mounted on a wheel support and an inner bearing ring having a bore therethrough. A wheel hub is connected to the inner bearing ring. A constant velocity universal joint has an outer joint member positioned within the bore of the inner bearing ring and an inner joint member. Means are provided to center the wheel hub with respect to the inner bearing ring and further means are provided for nonrotatably connecting the wheel hub to the outer joint member. The outer joint member is rotatably positioned but restrained against axial movement with respect to the inner bearing ring.

As a result of the wheel bearing assembly of the present invention smaller bending angles of the joints are now required because the relative distance of the universal joints can be increased. A further advantage is that the center of the universal joint can be positioned to coincide with the steering axis of the wheel so that the bending angle of the joint is the same as the angle through which the steered wheel is deflected.

Other objects and advantages of the present invention will be apparent upon reference to the accompanying description when taken in conjunction with the following drawings, which are exemplary, wherein;

FIG. 3 is a view similar to that of FIG. 1 but showing a modification thereof wherein the outer joint member is welded to the wheel hub;

FIGS. 4a and 4b are portions of the view of FIG. 2 showing different structures for axially securing the outer joint member;

FIG. 5 is a view similar to that of FIG. 1 but showing a further modification with respect to the connection between the outer joint member and the wheel hub;

FIG. 6 is a view similar to that of FIG. 5 but showing still further modifications;

FIG. 7 is a view similar to that of FIG. 1 but showing a modification wherein the outer joint member is secured against rotation with respect to the wheel hub by pins;

FIG. 8 is a partial sectional view taken along the line A in FIG. 7;

FIG. 11 is a view similar to that of FIG. 1 but showing a modification wherein the inner bearing ring is welded to the wheel hub;

FIG. 12 is a view similar to that of FIG. 11 and showing a further modification thereof; and FIG. 13 is a full sectional view as taken along the line indicated by the arrows in FIG. 12.

Proceeding next to the drawings wherein like reference symbols indicate the same parts throughout the various views a specific embodiment and modifications will be described in detail.

Figure 1:
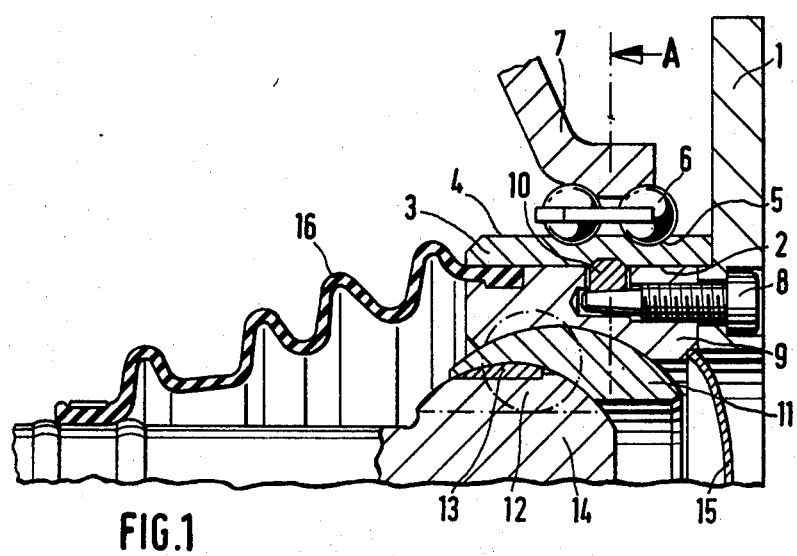
FIG. 1 is a longitudinal half sectional view through a wheel bearing assembly according to the present invention.

As may be seen in FIG. 1, a wheel bearing assembly for mounting a wheel of a motor vehicle comprises a wheel hub 1 provided with a flange or shoulder which is centered in a bore 2 of an inner bearing ring 3. The inner bearing ring 3 has an outer peripheral surface 4 in which are formed a pair of annular grooves 5 to receive roller ball bearings 6 which are also received in correspondingly shaped annular portions in an outer bearing ring 7 provided with a flange for attachment to a wheel support of the vehicle as known in the art. The inner bearing ring 3, roller bearing 6 and the outer bearing ring 7 constitute the wheel bearing mounted to a wheel support.

The wheel hub 1 to which may be mounted a wheel and also a brake disc is connected with an outer joint member 9 of a constant velocity torque transmitting universal joint by means of a plurality of screws 8. The outer joint member 9 is received within the bore 2 of the inner bearing ring 3 and is axially positioned with respect to the inner bearing ring 3 by an annular ring 10 positioned in opposing grooves formed in the outer joint member 9 and the inner bearing ring 3. The ends of the screws 8 are provided with tapered extensions as may be seen in FIG. 1 which engage the inner peripheral surface of the ring 10 to push the ring 10 radially outwardly on the principle of an inclined plane when the screws are tightened into their final positions as shown. The ring 10 is of the split ring type so as to be resilient under the action of the screws 8.

The outer joint member 9 has a spherical inner surface which guides the outer surface of a ball retaining cage 11 in which are positioned torque transmitting balls 12 indicated by the dashed lines. The inner surface of the cage 11 is guided upon a controlling element 13 and the outer surface of the inner joint member 14. As known in the art, the cage 11 is provided with openings to retain the balls 12 and the balls 12 are positioned in opposed pairs of axially extending grooves formed in the inner surface of the outer joint member 9 and in the outer surface of the inner joint member 14. The inner joint member 14 is connected to or may be made integral with a power transmission or drive shaft.

The space within the universal joint is sealed on the wheel side by a press-fitted metal cap 15 and on the drive shaft side by a flexible protective boot 16 of the bellows type and formed of a resilient material. One end of the boot 16 is received within an annular groove formed in the outer surface of the outer joint member 9 so that this end of the boot is received between the inner bearing ring 3 and outer joint member 9. The other end of the boot is secured in a known manner by a clamping collar or the like to the drive shaft extending from the inner joint member 14.

In order to remove the power transmission shaft it is only necessary to remove the screws 8 so that the ring 10 no longer resists axial displacement of the outer joint member 9 with respect to the inner bearing ring 3. Accordingly, the entire transmission shaft including the protective boot may be readily withdrawn from the wheel side of the wheel bearing mount.

Figure 2:
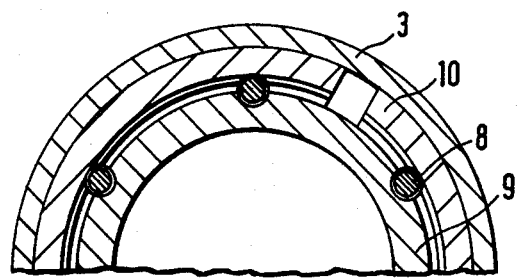
FIG. 2 is a sectional view taken along the line A in FIG. 1 and illustrating the axial securing of the outer joint member.

The screws 8 are circumferentially spaced in the face of the wheel hub 1 as indicated partially in FIG. 2. The tightening of the screws 8 causes their respective tapered ends to push uniformly upon the interior of the split ring 10 which is thus uniformly urged radially outwardly into the annular groove of the inner bearing ring 3.

The wheel bearing illustrated in FIG. 3 corresponds essentially with the structure of FIG. 1 with the exception that the outer joint member 9 and the wheel hub 1 are connected together by a welded seam 17. The axial attachment of the inner bearing ring and the outer joint member 9 is achieved by a split ring 10' whose split is provided with inclined surfaces in the axial direction as may be seen in the top plan view of FIG. 4b. Only a single screw 8' is utilized and the end of the screw wedges against the inclined surfaces to push the ring 10' radially outwardly when the screw 8' is tightened. The portion of FIG. 3 indicated with the "X" is that illustrated in greater detail in FIG. 4.

In the wheel bearing of FIG. 5, the wheel hub 1 is attached to the inner bearing ring 3 by screws 8a. Torque is transmitted directly from the outer joint member 9 to the wheel hub 1 by frictional engagement of these two components. The outer joint member 9 is provided with a projection 18 having a prismatic shape and received in a correspondingly shaped recess 19 in the wheel hub 1. When the screws 8a are tightened, the wheel hub will press the outer joint member 9 firmly against a shoulder 20 which provides axial interconnection between the inner bearing ring and the outer joint number and provides for torque transmission between the friction surfaces 18 and 19. The protective boot 16 is similarly attached by having a beaded end clamped or wedged into a groove formed in the inner surface of the inner bearing ring 3. The other end of the boot 16 is attached by a clamp or ring as described above. The transmission shaft can be similarly removed to the wheel side when the wheel hub screw 8a has been removed.

The wheel bearing of FIG. 6 is similar to that of FIG. 5 but the outer joint number is welded to the wheel hub 1 so as to transmit torque between these two components.

In the wheel bearing assembly of FIG. 7, torque is transmitted from the outer joint member 9 to the wheel hub 1 by means of a plurality of axially extending pins 21 received in opposing recesses formed in these two components. A shoulder 20 is provided on the inner bearing ring 3 to position axially the outer joint member 9 upon assembly. The interior space of the universal joint is sealed on one side by an annular bead of circular cross section 27 and on the other side by the flexible boot 16 which is mounted on the inner bearing ring 3 by means of a clamping ring 23. The other end of the boot 16 is mounted as described above to the drive shaft 22.

Figure 9:
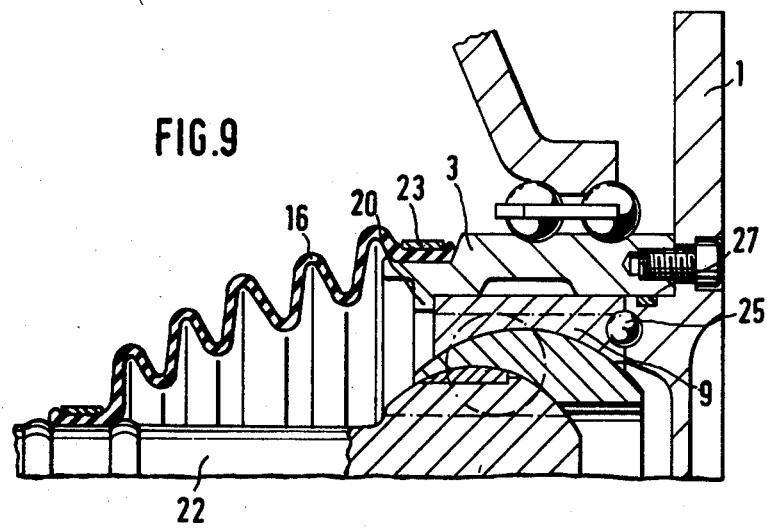
FIG. 9 is a view similar to that of FIG. 7 but showing the use of balls between the outer joint member and wheel hub.

The wheel bearing assembly of FIG. 9 is similar to that of FIG. 7 but the opposing recesses in the mating surfaces of wheel hub 1 and outer joint member 9 are made shorter so that a plurality of balls 25 can be employed for the transmission of torque between these two components.

As may be seen in FIG. 8, the torque transmitting elements in the form of pins 21 or balls 25 are positioned in bores formed between the grooves 24 which accommodate the torque transmitting elements of the universal joint.

Figure 10:
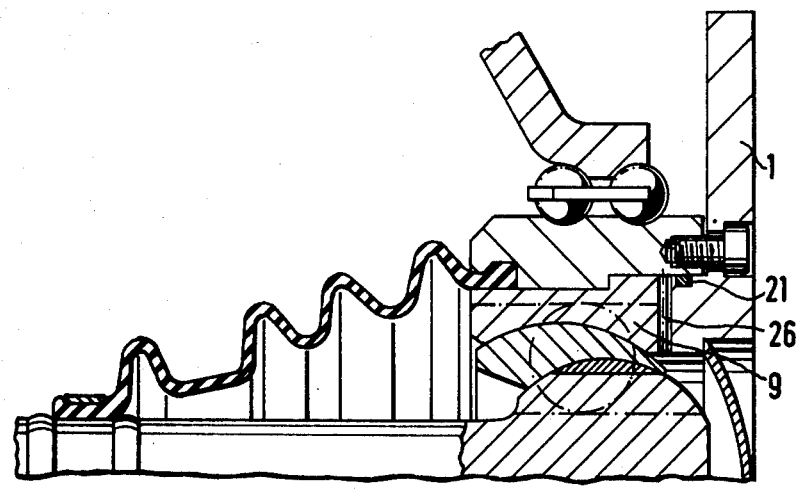
FIG. 10 is a view similar to that of FIG. 1 but showing the outer joint member and wheel hub nonrotatably engaged by meshing tooth formations.

The bearing assembly of FIG. 10 is essentially the same as those illustrated in FIG. 7 and 9 but the transmission of torque between the outer joint member 9 and wheel hub 1 is accomplished by interengaging or meshing radially extending teeth 26 provided on the mating surfaces of these components.

In FIGS. 11 and 12, the inner bearing ring 3 and the wheel hub 1 are welded together. In FIG. 11, torque is transmitted from the outer joint member 9 to the wheel hub 1 by an axially extending tooth formation 28 consisting of meshing teeth on the opposing circumferential surfaces of the hub 1 and outer joint member 9.

In FIG. 12, torque transmission is provided by an eccentric projection 29 on the outer joint member 9 whose central axis 30 is offset by a distance $a$ with respect to the axis of rotation 31 of the universal joint. The eccentric projection as shown in FIG. 13 may comprise a simple, double, triple or polygonal configuration.

Thus it is apparent that the wheel bearing assemblies disclosed herein provide ready and easy access for repair and maintenance purposes so as to facilitate assembly and disassembly operations which may be required for the replacement of one part. The entire power transmission shaft can be withdrawn as a whole from the wheel side of the right bearing assembly upon removal of the wheel hub. The bearing assemblies disclosed herein are more compact, simpler in structure and lighter in weight which adds to the economy of operation of the vehicle and furthermore eliminates the necessity for an axial pin.

The provision of an abutment annular surface in the bore of the inner bearing ring provides a stop against which the outer joint member is firmly pressed by the wheel hub secured to the inner bearing ring. The outer joint member is thus securely positioned in the axial direction since on the opposite end of the bore the wheel hub is connected with the inner bearing ring and functions as a stop against axial displacement in this direction.

Torque is effectively transmitted between the wheel hub and the outer joint member by cooperating frictional surfaces, connection by pins, balls or screws, meshing tooth formations or by welding the wheel hub to the outer joint member.

The end of the flexible sealing boot adjacent to the bearing assembly is secured without additional fastener elements either on the inner bearing ring or in a groove located in the dividing space between the outer joint member and inner bearing ring.

It will be understood that this invention is susceptible to modification in order to adapt it to different usages and conditions, and accordingly, it is desired to comprehend such modifications within this invention as may fall within the scope of appended claims.

What is claimed is:

1. A wheel bearing assembly for a wheel hub of a motor vehicle comprising an outer bearing ring adapted to be mounted on a wheel support and an inner bearing ring having a bore therethrough, a wheel hub connected to said inner bearing ring, a constant velocity torque transmitting joint having an outer joint member received within said bore and an inner joint member, said inner joint member being connected to a transmission shaft, means on said wheel hub engaging said inner bearing ring for centering said wheel hub within said bore of said inner bearing ring, means for nonrotatably connecting said wheel hub and said outer joint member, and means for positioning rotatably said outer joint member within said bore against axial movement with respect to said inner bearing ring, the opening of said bore directed toward the wheel hub being of such size with respect to the outer surface of said outer joint member that the transmission shaft can be withdrawn from the wheel side of the wheel bearing mount.

2. A wheel bearing assembly as claimed in claim 1 wherein said positioning means comprises an annular element jointly received in opposing grooves in said outer joint member and said inner bearing ring.

3. A wheel bearing assembly as claimed in claim 2 and comprising detachable fastener elements threadedly interconnecting said wheel hub and outer joint member, said elements engaging said annular element to position said annular element with respect to said outer joint member and said inner bearing ring.

4. A wheel bearing assembly as claimed in claim 1 wherein the bore of said inner bearing ring has an annular surface thereon abutted by a second annular surface on said outer joint member.

5. A wheel bearing assembly as claimed in claim 1 and further comprising engaging first and second friction surfaces on said wheel hub and said outer joint member to transmit torque therebetween.

6. A wheel bearing assembly as claimed in claim 1 and comprising torque transmitting elements comprising one of pins and balls interconnecting said wheel hub and said outer joint member.

7. A wheel bearing assembly as claimed in claim 1 and further comprising means for inseparably interconnecting said wheel hub and outer joint member.

8. A wheel bearing assembly as claimed in claim 1 and comprising detachable fastener elements interconnecting said wheel hub and said outer joint member.

9. A wheel bearing assembly as claimed in claim 1 and further comprising means comprising one of threaded fastener elements, a resilient ring and an eccentric for interconnecting said wheel hub and inner bearing ring.

10. A wheel bearing assembly as claimed in claim 1 wherein said non-rotatably connecting means comprises meshing radially extending teeth on said wheel hub and outer joint member.

11. A wheel bearing assembly as claimed in claim 1 and a flexible protective boot connected between a driven shaft leading to said inner joint member and to one of said inner bearing ring and a groove between said outer joint member and said inner bearing ring.

12. A wheel bearing assembly as claimed in claim 1 wherein said positioning means comprises a split ring disposed in an annular groove in said inner bearing member and engageable with said bore.

13. A wheel bearing assembly as claimed in claim 1 wherein said outer joint member is fixed against axial movement within said bore by the connection of said wheel hub to said inner bearing ring.

* * * * *